July 26, 1932.   M. E. PENNINGTON   1,868,542
SCALE FOR DETERMINING COLOR OF EGG MEAT
Filed June 26, 1931
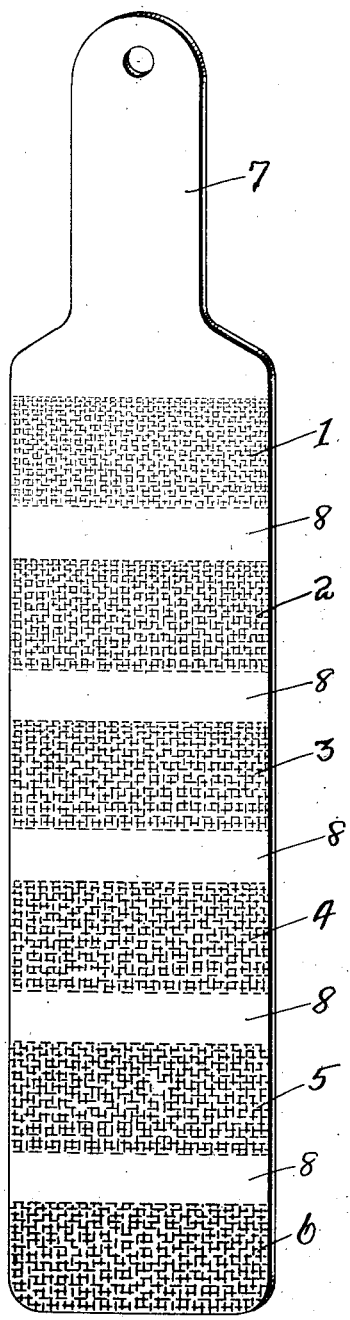
INVENTOR
Mary E. Pennington
BY English and Studwell
ATTORNEYS Patented July 26, 1932

1,868,542

UNITED STATES PATENT OFFICE

MARY E. PENNINGTON, OF NEW YORK, N. Y., ASSIGNOR TO THE BORDEN COMPANY, OF NEW YORK, N. Y., A CORPORATION OF NEW JERSEY

SCALE FOR DETERMINING COLOR OF EGG MEAT

Application filed June 26, 1931. Serial No. 546,975.

The invention relates to a scale for determining the color of egg meat.

Egg meat, or egg batter, as it is sometimes called, consists of a mixture of the yolks and whites of hens' eggs or of the yolks alone. Such material is extensively used by bakers, confectioners and others. The egg meat may be supplied to the user freshly broken from the shell. More commonly, however, it is supplied in frozen condition and thawed out before use. The color or shade of the egg meat or batter whether fresh or frozen is a factor of great importance to the buyer and user. For example, a baker wishes to produce a cake of rich golden color, and he has a reputation for making such cake. Now yellow colored cake is usually dependent for its color on the depth of the shade of yellow of the eggs, either mixed whites and yolks, or yolks alone, which the baker puts into the ingredients composing the cake, since it is forbidden by law to use artificial coloring matter unless that fact is noted on the package containing the cake. The shade of yellow of the yolks of hens' eggs, however, varies widely in different sections of the country and at different seasons of the year. If the food of a hen is composed largely of greens and/or yellow corn, the yolk of the egg which the hen lays will be of a deep yellow or orange color. On the other hand, if the food of the hen is lacking in green stuff or in yellow corn or the like, the yolk of the egg the hen lays will be of a light yellow, or even almost colorless. Moreover during the late winter and early spring season in this country the yolks of the eggs laid by hens in the northern part of the country are much lighter than the yolks of the eggs laid by hens in the southern part of the country, because the food of the northern hens necessarily lacks any considerable proportion of green stuff, whereas the food of the southern hens will contain a considerable proportion of green stuff.

These facts present to the breaker of eggs, that is to say, to the merchant who deals in egg meat broken from the shells, the problem of making up properly colored or shaded mixtures for his customers. In order to produce and have on hand properly shaded mixtures of egg-meat or batter to satisfy the demands of his customers, it is customary to mix together the yolks or mixed whites and yolks of eggs coming from different parts of the country. Egg meat or batter consisting wholly of yolks usually has a deeper shade of yellow or orange than egg meat or batter consisting of a mixture of whites and yolks. In general, there is recognized in the trade about three primary shades of yolk color and about three primary shades of color of mixed whites and yolks. These primary shades of color range from a rich orange to a light yellow. They are so distinct from each other visually, that some egg meats do not exactly match them but may be of a shade which falls between two of the primary shades. In such case, it is easy to identify the shade of the egg meat in question by giving it the number of the next lighter primary shade which it most closely approaches, and then indicating its difference from that primary shade by the fractional amount it approaches to the next deeper primary shade.

Heretofore, it was common practice in the trade to order egg meat or batter by such general terms as deep, very deep, bright, light, and so forth. These loose general terms have resulted in much confusion and misunderstanding, both on the part of the person ordering the egg meat and on the part of the egg meat producer, to the disadvantage of both. To meet and remedy this situation, I have produced the color scale for eggs which is the subject of the present invention. To meet all the requirements of the trade in egg meat or batter, it has been necessary to produce a device which is not only suitable for insertion into egg meat freshly removed from the shells, but also into partly frozen egg meat. To this end I have produced a device which is not only convenient to handle and read but which can without liability of breakage or damage to the egg material be plunged into soft or semi-frozen egg meats. Another requirement of the scale for determining the tones or shades of yellow or orange of egg meat is that the primary shades on the scale be so located as not to interfere with each other so that the color or shade of color of the egg meat under examination can be accurately determined. In accordance with this feature of the invention, the primary colors or shades are spread upon a white background and are spaced such distance apart as not to interfere with each other in determining the shade of color of the mass of egg meat being tested.

The preferred embodiment of the color scale for eggs constituting the present invention is illustrated in the accompanying drawing which is an isometric perspective of my improved scale for determining the color of egg meat. The improved scale is preferably composed of metal, conveniently about one-thirty second of an inch thick, about two and one-half inches wide, and of a length suitable for containing the required number of color strips which are preferably about one inch in width. One end of the device is provided with a handle 7 by which it may be manipulated in plunging it into the mass of egg material whose color is to be determined. The material of which the color scale is composed, metal or other suitable material, is first coated with white porcelain or other white non-absorptive material. Upon this white background there is laid on one side of the device a series of differently shaded bands of suitable non-absorptive pigments ranging from light yellow to deep orange. There may be any preferred number of bands, but a series of six differently shaded bands has been found suitable for most purposes, and these six differently shaded yellow and orange bands are known as the six primary shades of egg meat or batter, and approximately match the shades of yellow or orange of yolks or mixed whites and yolks of the usual commercial run of hens' eggs. These primary tones or shades are represented on the drawing by the reference numerals 1 to 6, inclusive, beginning with the lightest yellow shade which is indicated at the top of the illustrated scale. The deepest shade or color of the color bands on the scale is indicated at the bottom of the scale. The adjacent color bands are separated in each instance and are a sufficient distance apart to prevent the next succeeding or upper color band interfering with the band in use determining the color or shade of the egg meat being tested. For this purpose the space 8 separating two adjacent color bands is at least one-third of the width of each color band. The attempt has been made in the drawing to indicate a gradual increase in depth of color from the band 1 of light yellow to the band 6 of deep orange. Thus it will be recognized that the band indicated at 2 is of a slightly deeper yellow than band 1 and that the band indicated at 3 is of a still deeper yellow shade or tone. The band indicated at 4 is of a very deep yellow or light orange shade, whereas the band indicated at 5 is of a deeper shade than band 4 but not quite so deep as band 6. The bands numbered 1, 2, 3 and 4 represent the usual shades of color of whole eggs, that is, mixed whites and yolks, whereas the bands 4, 5 and 6 represent the usual color of yolks alone. The colors of the bands on the illustrated scale were made by matching the colors of yolks of hens' eggs and the colors of mixed whites and yolks, with suitable pigments, and then placing the pigments on the strip of metal covered with white porcelain.

The improved scale for determining the color or shade of egg meat is used in the following manner: The baker, confectioner, or other user of egg meat or batter is provided with one of these scales and he selects, according to its number, the shade of yellow or orange he wishes the mass of egg meat he is ordering to be. If the colors on the scale do not exactly match with the desired color but are between two adjacent colors he may order the egg meat by giving the number of the next lower shade and adding a fraction to indicate how much over that shade the required shade is. For example, assuming that a baker wants a shade of egg meat which is darker than band 3 but not so dark as band 4, the baker will designate the required shade as 3¼, or 3½, or 3¾. In this manner the required shade may be very closely approximated. The baker or other user ordering the egg meat will then transmit his order to the dealer in egg meat by the number of shade on the color scale, with which the dealer in egg meat will also be provided. The egg meat dealer will then insert his scale into different batches of egg meat until he finds one that most closely approaches in color or shade, the color of egg meat ordered by the baker. In this manner the baker is supplied with egg meat having a color which very closely approaches the color of egg meat which he has ordered and thus the uncertainties and misunderstandings of the former methods of ordering egg meat by color are eliminated.

I claim:—

1. A device for determining the shade of color of egg meat comprising a strip of sheet metal having a white coating of non-absorptive material thereon, one end of the device constituting a handle, and a series of colored bands, each two adjacent colored bands being spaced apart by a strip of white, said colored bands ranging from light yellow to deep orange.

2. A device for determining the shade of color of egg meat comprising a strip of stiff material formed with a handle at one end and having a coating of white non-absorptive material thereon and a series of transversely arranged colored bands ranging from light yellow to deep orange, whereby the color of a mixture of yolks and whites of hens' eggs and yolks alone of hens' eggs may be determined.

3. A device for determining the color shades of egg meat comprising a relatively thin and wide strip of stiff material coated white and a series of transversely arranged colored bands superposed upon the white and spaced apart to exhibit strips of white between the adjacent colored bands, said colored bands varying in depth of shade whereby the natural shades of color of mixed whites and yolks of hens' eggs and the yolks alone of hens' eggs may be determined.

4. A device for determining the shades of color of different batches of egg meat comprising a strip of thin relatively wide metal, a handle formed on one end of the device, a coating of white porcelain on the metal, and a series of transversely arranged colored bands superposed upon the porcelain and spaced apart to exhibit a strip of white between two adjacent colored bands, said colored bands being of successively deeper shades from light yellow to deep orange to match the natural color of a mixture of yolks and whites of hens' eggs and the natural color of the yolks alone.

MARY E. PENNINGTON.